US012743485B2

(12) United States Patent
Homer et al.

(10) Patent No.: US 12,743,485 B2
(45) Date of Patent: Sep. 22, 2026

(54) SYSTEMS AND METHODS FOR ENHANCING TRAINABLE OPTICAL CHARACTER RECOGNITION (OCR) PERFORMANCE

(71) Applicant: ZEBRA TECHNOLOGIES CORPORATION, Lincolnshire, IL (US)

(72) Inventors: Matthew Lawrence Homer, Sound Beach, NY (US); Robert W. DiGiovanna, Shirley, NY (US); Frederick D. Liguori, III, Holtsville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 780 days.

(21) Appl. No.: 17/395,168

(22) Filed: Aug. 5, 2021

(65) Prior Publication Data

US 2023/0042611 A1 Feb. 9, 2023

(51) Int. Cl.
*G06F 18/21* (2023.01)
*G06F 18/22* (2023.01)
(Continued)

(52) U.S. Cl.
CPC ............ *G06F 18/217* (2023.01); *G06F 18/22* (2023.01); *G06F 18/28* (2023.01); *G06F 18/40* (2023.01);
(Continued)

(58) Field of Classification Search
CPC ...... G06V 30/10; G06V 30/12; G06V 30/127; G06V 30/133; G06V 30/00; G06V 30/148;
(Continued)

(56) References Cited

U.S. PATENT DOCUMENTS 5,880,451 A * 3/1999 Smith .................... G06V 10/98 235/462.15
6,427,032 B1 * 7/2002 Irons .................... H04N 1/2187 707/999.107

(Continued)

FOREIGN PATENT DOCUMENTS

CN 106446732 B 5/2019
CN 111738031 B 10/2020

OTHER PUBLICATIONS

International Search Report and Written Opinion for International Application No. PCT/US2022/31369 mailed on Sep. 8, 2022.

*Primary Examiner* — Atiba O Fitzpatrick

(57) ABSTRACT

Systems and methods for enhancing trainable optical character recognition (OCR) performance are disclosed herein. An example method includes receiving, at an application executing on a user computing device communicatively coupled to a machine vision camera, an image captured by the machine vision camera, the image including an indicia encoding a payload and a character string. The example method also includes identifying the indicia and the character string; decoding the indicia to determine the payload; and applying an optical character recognition (OCR) algorithm to the image to interpret the character string and identify an unrecognized character within the character string. The example method also includes comparing the payload to the character string to validate the unrecognized character as corresponding to a known character included within the payload; and responsive to validating the unrecognized character, adding the unrecognized character to a font library referenced by the OCR algorithm.

17 Claims, 4 Drawing Sheets

(51) Int. Cl.

| | |
|---|---|
| ***G06F 18/28*** | (2023.01) |
| ***G06F 18/40*** | (2023.01) |
| ***G06K 7/10*** | (2006.01) |
| ***G06K 7/14*** | (2006.01) |
| ***G06V 10/776*** | (2022.01) |
| ***G06V 30/26*** | (2022.01) |
| *G06V 30/10* | (2022.01) |

(52) U.S. Cl.
CPC ....... *G06K 7/10722* (2013.01); *G06K 7/1413* (2013.01); *G06V 10/776* (2022.01); *G06V 30/26* (2022.01); *G06V 30/10* (2022.01)

(58) Field of Classification Search
CPC .... G06V 30/153; G06V 30/26; G06V 30/262; G06V 30/268; G06V 30/274; G06V 10/70; G06V 10/82; G06V 10/774–7796; G06V 10/776; G06V 10/7747; G06V 10/7753; G06T 2207/30176; G06T 2207/20081; G06T 2207/20084; G06T 7/0002; G06T 1/0021–0092; G06T 2201/005–0601; G06K 9/6256; G06K 9/6257; G06K 9/6259; G06K 7/1404; G06K 7/1408; G06K 7/1413; G06K 7/1417; G06K 7/1421; G06K 7/1426; G06K 7/143; G06K 7/1434; G06K 7/1439; G06K 7/1443; G06K 7/1447; G06K 7/1452; G06K 7/1456; G06N 3/02–126; G06N 20/00–20; G06N 3/08–0985; G06F 18/214–2155; G06F 7/023; G06F 40/16; G06F 18/217; G06F 18/2148; G06F 18/28
See application file for complete search history.

(56) References Cited

U.S. PATENT DOCUMENTS

| | | | | |
|---|---|---|---|---|
| 2009/0220175 | A1 | 9/2009 | Tzadok et al. | |
| 2012/0106787 | A1 | 5/2012 | Nechiporenko et al. | |
| 2013/0063620 | A1* | 3/2013 | Kim | G06K 7/10 348/222.1 |
| 2013/0243324 | A1 | 9/2013 | King et al. | |
| 2014/0009612 | A1 | 1/2014 | King | |
| 2015/0254507 | A1 | 9/2015 | Lin et al. | |
| 2016/0019431 | A1 | 1/2016 | Wang et al. | |
| 2016/0019439 | A1* | 1/2016 | Wang | G06V 30/224 382/183 |
| 2019/0197277 | A1* | 6/2019 | Taira | G06K 7/10722 |
| 2020/0065537 | A1* | 2/2020 | He | G06K 7/10722 |
| 2021/0073532 | A1* | 3/2021 | Torres | G06F 18/214 |
| 2021/0303895 | A1* | 9/2021 | Soga | G06N 5/04 |

* cited by examiner

SYSTEMS AND METHODS FOR ENHANCING TRAINABLE OPTICAL CHARACTER RECOGNITION (OCR) PERFORMANCE

BACKGROUND

Since the introduction of affordable machine vision systems, these systems have been rapidly adopted across a vast number of industries to suit an even larger number of purposes. In tandem with their adoption, developers have been consistently attempting to increase and maximize the accuracy of these machine vision systems. Machine vision may generally provide high fidelity image analysis, but may also suffer from a lack of accuracy when not properly trained. As such, training machine vision systems is a topic of great interest in a wide variety of industries.

However, training such machine vision systems is conventionally a computationally intensive process that may take place before system implementation and/or otherwise drastically reduce the efficiency of the process imaged by the machine vision system. For example, optical character recognition (OCR) applications conventionally rely upon a user manually building a library of characters that cannot be identified by the OCR algorithm. Consequently, when the OCR library is initialized, the OCR may frequently fail because the library definition for an unrecognized character may be insufficient to confidently identify the unrecognized character, resulting in numerous errors and process inefficiency. These issues are particularly acute in instances where OCR may be required to categorize the item type for chain of custody operations.

Thus, there is a need for systems and methods for enhancing trainable OCR performance that allow for fast, efficient, and accurate character recognition and OCR library training.

SUMMARY

In an embodiment, the present invention is a method for enhancing trainable optical character recognition (OCR) performance. The method may comprise: receiving, at an application executing on a user computing device communicatively coupled to a machine vision camera, an image captured by the machine vision camera, the image including an indicia encoding a payload and a character string; identifying, in the image, the indicia and the character string; decoding the indicia to determine the payload; applying an optical character recognition (OCR) algorithm to the image, wherein the OCR algorithm interprets the character string and identifies an unrecognized character within the character string; comparing the payload to the character string to validate the unrecognized character as corresponding to a known character included within the payload; and responsive to validating the unrecognized character, adding the unrecognized character to a font library (referenced herein as an "OCR library", "trainable OCR library", and "OCR font library") referenced by the OCR algorithm as an entry for the known character.

In a variation of this embodiment, the OCR algorithm identifying the unrecognized character further comprises: determining, by the OCR algorithm, that the unrecognized character corresponds to each respective known character from the font library at respective confidence levels that do not satisfy an automatic recognition threshold.

In another variation of this embodiment, comparing the payload to the character string further comprises: determining, by the OCR algorithm, whether or not the unrecognized character satisfies an acceptable confidence threshold when compared to the known character included within the payload; and responsive to determining that the unrecognized character satisfies the acceptable confidence threshold, validating the unrecognized character as the known character included within the payload. Further in this variation, the acceptable confidence threshold is defined by a user interacting with an interface of the application. Further in this variation, comparing the payload to the character string further comprises: responsive to determining that the unrecognized character does not satisfy the acceptable confidence threshold, comparing, by the OCR algorithm, each entry of the font library corresponding to the known character to the unrecognized character; determining, by the OCR algorithm, whether or not the unrecognized character satisfies a font library entry threshold, wherein the font library entry threshold is based on a composite similarity score between the unrecognized character and each entry of the font library corresponding to the known character; and responsive to determining that the unrecognized character satisfies the font library entry threshold, validating the unrecognized character as the known character included within the payload.

In yet another variation of this embodiment, comparing the payload to the character string further comprises: determining, by the OCR algorithm, whether or not the unrecognized character satisfies an acceptable confidence threshold when compared to the known character included within the payload; responsive to determining that the unrecognized character does not satisfy the acceptable confidence threshold, comparing, by the OCR algorithm, each entry in the font library to the unrecognized character; determining, by the OCR algorithm, whether or not the unrecognized character satisfies a respective font library entry threshold, wherein the respective font library entry threshold is based on a respective composite similarity score between the unrecognized character and each entry of the font library corresponding to the respective known character; and responsive to determining that the unrecognized character satisfies a first respective font library entry threshold, validating the unrecognized character as the first respective known character included within the payload.

In still another variation of this embodiment, comparing the payload to the character string to validate the unrecognized character further comprises: creating, by the application, a relative fixture of the character string and the indicia to allow a user to rotate and vary image characteristics of the image without disassociating the character string from the indicia.

In yet another variation of this embodiment, the method further comprises displaying, on an interface of the application, the character string, wherein the unrecognized character is replaced with the known character.

In another embodiment, the present invention is a machine vision system for enhancing trainable optical character recognition (OCR) performance. The system may comprise: a machine vision camera configured to capture an image including an indicia encoding a payload and a character string; and a user computing device executing an application. The user computing device is communicatively coupled to the machine vision camera and is configured to: receive the image captured by the machine vision camera, identify, in the image, the indicia and the character string, decode the indicia to determine the payload, apply an optical character recognition (OCR) algorithm to the image, wherein the OCR algorithm interprets the character string and identifies an unrecognized character within the character string, compare the payload to the character string to validate the unrecognized character as corresponding to a known character included within the payload, and responsive to validating the unrecognized character, add the unrecognized character to a font library referenced by the OCR algorithm as an entry for the known character.

In a variation of this embodiment, the user computing device, applying the OCR algorithm, identifies the unrecognized character by determining that the unrecognized character corresponds to each respective known character from the font library at respective confidence levels that do not satisfy an automatic recognition threshold.

In another variation of this embodiment, the user computing device is further configured to: determine, by the OCR algorithm, whether or not the unrecognized character satisfies an acceptable confidence threshold when compared to the known character included within the payload, and responsive to determining that the unrecognized character satisfies the acceptable confidence threshold, validate the unrecognized character as the known character included within the payload. Further in this variation, the acceptable confidence threshold is defined by a user interacting with an interface of the application. Further in this variation, the user computing device is further configured to: responsive to determining that the unrecognized character does not satisfy the acceptable confidence threshold, compare, by the OCR algorithm, each entry of the font library corresponding to the known character to the unrecognized character, determine, by the OCR algorithm, whether or not the unrecognized character satisfies a font library entry threshold, wherein the font library entry threshold is based on a composite similarity score between the unrecognized character and each entry of the font library corresponding to the known character, and responsive to determining that the unrecognized character satisfies the font library entry threshold, validate the unrecognized character as the known character included within the payload.

In yet another variation of this embodiment, the user computing device is further configured to: determine, by the OCR algorithm, whether or not the unrecognized character satisfies an acceptable confidence threshold when compared to the known character included within the payload, responsive to determining that the unrecognized character does not satisfy the acceptable confidence threshold, compare, by the OCR algorithm, each entry in the font library to the unrecognized character, determine, by the OCR algorithm, whether or not the unrecognized character satisfies a respective font library entry threshold, wherein the respective font library entry threshold is based on a respective composite similarity score between the unrecognized character and each entry of the font library corresponding to the respective known character, and responsive to determining that the unrecognized character satisfies a first respective font library entry threshold, validate the unrecognized character as the first respective known character included within the payload.

In still another variation of this embodiment, the user computing device is further configured to: create, by the application, a relative fixture of the character string and the indicia to allow a user to rotate and vary image characteristics of the image without disassociating the character string from the indicia.

In yet another embodiment, the present invention is a tangible machine-readable medium comprising instructions that, when executed, cause a machine to at least: receive, from a machine vision camera, an image including an indicia encoding a payload and a character string; identify, in the image, the indicia and the character string; decode the indicia to determine the payload; apply an optical character recognition (OCR) algorithm to the image, wherein the OCR algorithm interprets the character string and identifies an unrecognized character within the character string; compare the payload to the character string to validate the unrecognized character as corresponding to a known character included within the payload; and responsive to validating the unrecognized character, add the unrecognized character to a font library referenced by the OCR algorithm as an entry for the known character.

In a variation of this embodiment, the instructions, when executed, further cause the machine to at least: identify, by the OCR algorithm, the unrecognized character by determining that the unrecognized character corresponds to each respective known character from the font library at respective confidence levels that do not satisfy an automatic recognition threshold.

In another variation of this embodiment, the instructions, when executed, further cause the machine to at least: determine, by the OCR algorithm, whether or not the unrecognized character satisfies an acceptable confidence threshold when compared to the known character included within the payload; and responsive to determining that the unrecognized character satisfies the acceptable confidence threshold, validate the unrecognized character as the known character included within the payload. Further in this variation, the instructions, when executed, further cause the machine to at least: responsive to determining that the unrecognized character does not satisfy the acceptable confidence threshold, compare, by the OCR algorithm, each entry of the font library corresponding to the known character to the unrecognized character; determine, by the OCR algorithm, whether or not the unrecognized character satisfies a font library entry threshold, wherein the font library entry threshold is based on a composite similarity score between the unrecognized character and each entry of the font library corresponding to the known character; and responsive to determining that the unrecognized character satisfies the font library entry threshold, validate the unrecognized character as the known character included within the payload.

In yet another variation of this embodiment, the instructions, when executed, further cause the machine to at least: determine, by the OCR algorithm, whether or not the unrecognized character satisfies an acceptable confidence threshold when compared to the known character included within the payload; responsive to determining that the unrecognized character does not satisfy the acceptable confidence threshold, compare, by the OCR algorithm, each entry in the font library to the unrecognized character; determine, by the OCR algorithm, whether or not the unrecognized character satisfies a respective font library entry threshold, wherein the respective font library entry threshold is based on a respective composite similarity score between the unrecognized character and each entry of the font library corresponding to the respective known character; and responsive to determining that the unrecognized character satisfies a first respective font library entry threshold, validate the unrecognized character as the first respective known character included within the payload.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
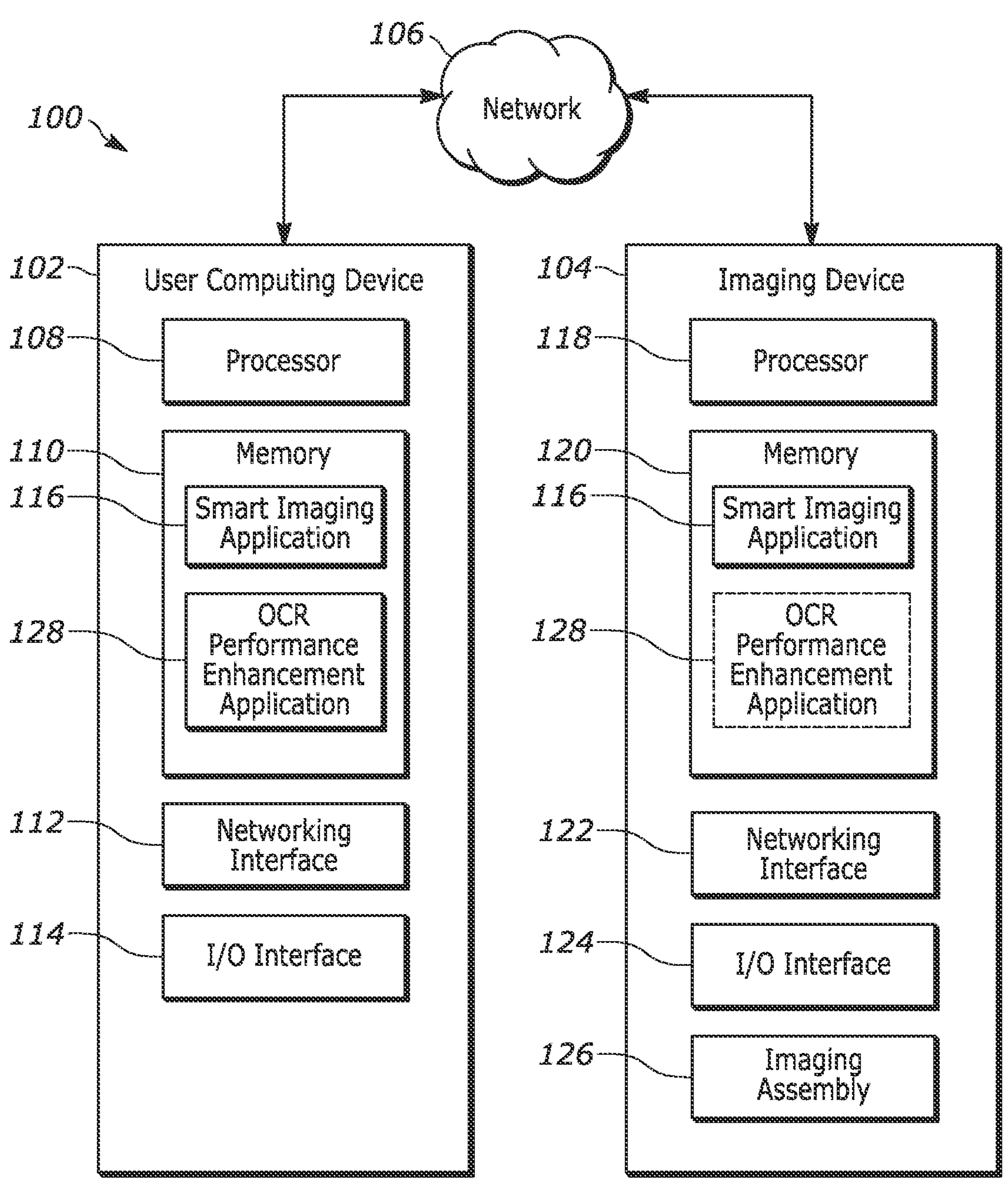
FIG. 1 is an example smart imaging system for enhancing trainable optical character recognition (OCR) performance, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Machine vision system owners/operators have conventionally been plagued with being unable to quickly and accurately train machine vision applications (e.g., optical character recognition (OCR)). Conventional OCR systems require tedious and time-consuming manual entry of character definitions into a trainable OCR library. As a result, conventional OCR systems frequently misidentify characters and/or otherwise fail to accurately identify characters due to a lack of OCR library definition for these characters, causing numerous errors, process shutdowns, and overall process inefficiency.

Thus, it is an objective of the present disclosure to eliminate these and other problems with conventional OCR systems by enabling automatic character recognition and training of an OCR library using barcode data. The systems and methods of the present disclosure thereby provide more accurate and efficient OCR library training and character recognition than conventional machine vision systems (e.g., conventional OCR systems). As described herein, the embodiments of the present disclosure may reduce the need for costly additional image captures, speed up the training and overall implementation of an OCR system, and generally ensure that the OCR system maximizes image capture and processing efficiency and accuracy.

FIG. 1 illustrates an example smart imaging system 100 for enhancing trainable optical character recognition (OCR) performance, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. Namely, the imaging device 104 may be connected to the user computing device 102 via a network 106, and may generally be configured to interpret and process information received from the user computing device 102.

As an example, the imaging device 104 may obtain a job file containing one or more job scripts from the user computing device 102 across the network 106 that may define the machine vision job and may configure the imaging device 104 to capture and/or analyze images in accordance with the machine vision job. The imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

In any event, the user computing device 102 is generally configured to enable a user/operator to, for example, create and upload a machine vision job for execution and/or otherwise interact with the imaging device 104. The user/operator may transmit/upload any configuration adjustment, software updates, and/or any other suitable information to the imaging device 104 via the network 106, where the information is then interpreted and processed accordingly. The user computing device 102 may comprise one or more operator workstations, and may include one or more processors 108, one or more memories 110, a networking interface 112, an input/output (I/O) interface 114, a smart imaging application 116, and an optical character recognition (OCR) performance enhancement application 128.

Generally, the smart imaging application 116 may include and/or otherwise comprise executable instructions (e.g., via the one or more processors 108) that allow a user to configure a machine vision job and/or imaging settings of the imaging device 104. For example, the smart imaging application 116 may render a graphical user interface (GUI) on a display (e.g., I/O interface 114) of the user computing device 102, and the user may interact with the GUI to change various settings, modify machine vision jobs, input data, etc. Moreover, the smart imaging application 116 may output results of the executed machine vision job for display to the user, and the user may again interact with the GUI to approve the results, modify imaging settings to re-perform the machine vision job, and/or any other suitable input or combinations thereof.

The OCR performance enhancement application 128 may include and/or otherwise comprise executable instructions (e.g., via the one or more processors 108) that automatically perform OCR on images captured by the imaging device 104 and train a trainable OCR library based on decoded payloads of corresponding indicia. For example, an indicia (e.g., barcode) printed on an object may include a character string (e.g., text string) proximate (e.g., above, below, beside) to the indicia. When the indicia is decoded, and the payload is interpreted, the one or more processors 108 may execute an OCR algorithm, which is a part of the OCR performance enhancement application 128, to identify/interpret the character string proximate to the indicia. In the event that the OCR algorithm is unable to interpret all/part of the character string due to one or more unrecognized characters, the OCR algorithm may include instructions causing the one or more processors 108 to compare the decoded payload of the indicia with the character string to determine likely characters corresponding to the one or more unrecognized characters.

Moreover, the OCR performance enhancement application 128 may include instructions causing the one or more processors 108 to fix the position of the indicia relative to the corresponding character string. For example, when analyzing an image captured by the imaging device 104, the one or more processors 108 may identify the location of an indicia and the corresponding character string within the image. In response, the OCR performance enhancement application 128 may instruct the one or more processors 108 to save/store the locations of the indicia and the corresponding character string within the one or more memories 110 and/or the relative locations of the indicia with respect to the corresponding character string. For example, assume that an indicia within a first image captured by the imaging device 104 is displaced 3 pixels above and 5 pixels to the right of the corresponding character string. In this example, the OCR performance enhancement application 128 may instruct the one or more processors 108 to store the relative location (3 pixels above and 5 pixels to the right) of the indicia with respect to the corresponding character string in the one or more memories 110, such that subsequent instructions from the OCR performance enhancement application 128 may utilize this relative displacement to accurately locate the character string/indicia regardless of adjustments to the orientation of the first image.

The imaging device 104 may include one or more processors 118, one or more memories 120, a networking interface 122, an I/O interface 124, an imaging assembly 126, as well as the smart imaging application 116 and, optionally, the OCR performance enhancement application 128. The imaging assembly 126 may include a digital camera and/or digital video camera for capturing or taking digital images and/or frames. Each digital image may comprise pixel data that may be analyzed in accordance with instructions comprising the smart imaging application 116 and/or the OCR performance enhancement application 128, as executed by the one or more processors 118, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing, for example, the smart imaging application 116 and/or the OCR performance enhancement application 128 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, OCR performance enhancement application 128, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110, 120 may also store the smart imaging application 116 and/or the OCR performance enhancement application 128. Additionally, or alternatively, the smart imaging application 116 and/or the OCR performance enhancement application 128 may also be stored in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116 and/or the OCR performance enhancement application 128, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, a trainable OCR library (e.g., including recognized characters stored as a result of the OCR performance enhancement application 128) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally, or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to initiate imaging setting calibration, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2A:
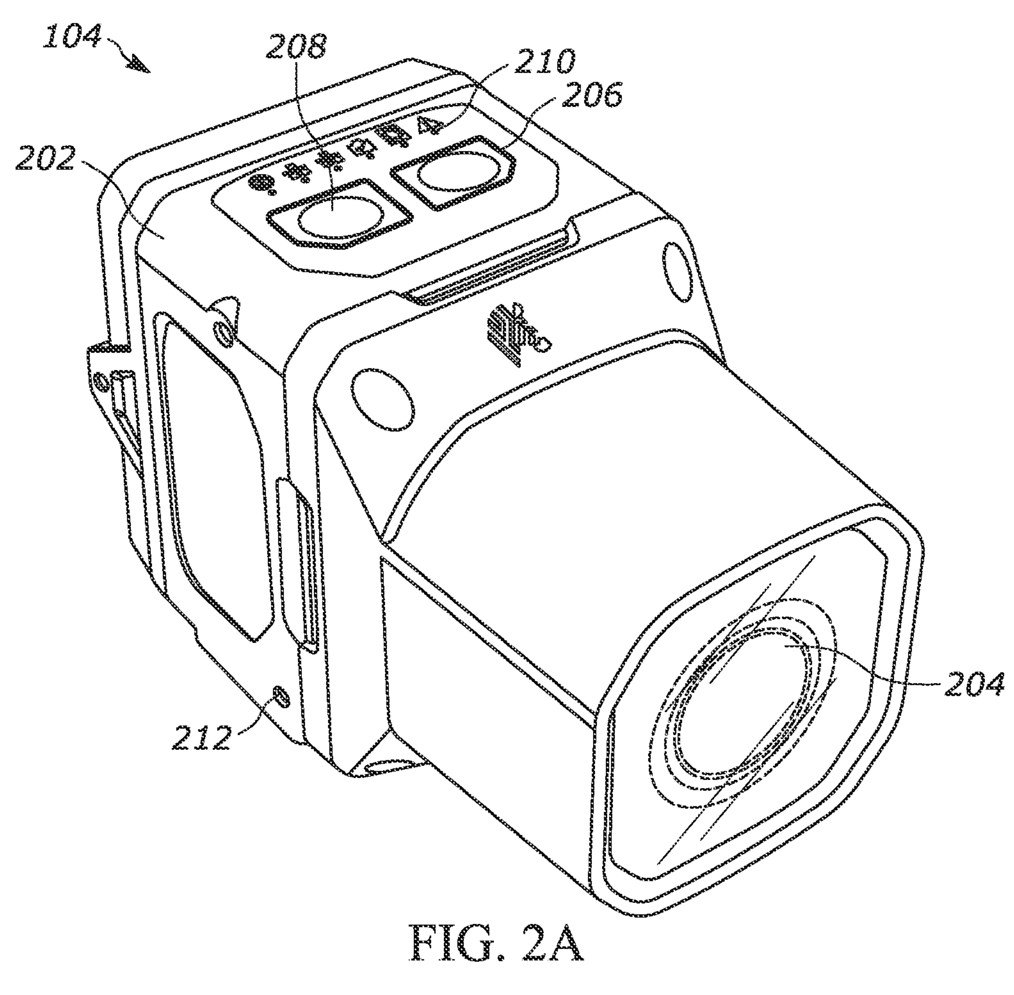
FIG. 2A is a perspective view of the imaging device of FIG. 1, in accordance with embodiments described herein.

FIG. 2A is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may automatically and/or in response to instructions received from a user computing device (e.g., user computing device 102) initiate an application (e.g., smart imaging application 116 and/or the OCR performance enhancement application 128) to allow a user to configure and/or execute a machine vision job and/or imaging settings of the imaging device 104. Of course, the imaging device 104 may independently adjust the imaging settings (e.g., of the imaging assembly 126) in response to the determinations made as part of the execution of the smart imaging application 116 and/or the OCR performance enhancement application 128, and/or the imaging device 104 may transmit an indication of these determinations to the user computing device 102 for review/acceptance by a user/operator.

For example, the determinations made as part of the execution of the smart imaging application 116 and/or the OCR performance enhancement application 128 may include instructions to adjust one or more settings related to the imaging aperture 204. Namely, assume that at least a portion of the analysis corresponding to the execution of the smart imaging application 116 and/or the OCR performance enhancement application 128 requires the imaging device 104 to maximize the brightness of the indicia and corresponding character string within a captured image. To accommodate this requirement, the imaging device 104 may increase the aperture size of the imaging aperture 204. Thus, the imaging device 104 may be configured to automatically adjust its own configuration to capture images with optimal image characteristics/qualities (e.g., brightness, sharpness), at least for the indicia and corresponding character string. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in machine vision jobs.

As another example, the tuning function of a dome switch/button (e.g., dome/switch button 208) may enable a user to automatically and/or manually adjust the configuration of the imaging device 104 in and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in machine vision jobs, as discussed herein. Further, and as discussed further herein, a user may utilize the imaging configuration screen (or more generally, the smart imaging application 116 and/or the OCR performance enhancement application 128) to configure specific parameters of a preferred machine vision job/task that enable the imaging device 104 to automatically perform imaging setting calibration in a manner that tailors the imaging settings resulting from execution of the smart imaging application 116 and/or the OCR performance enhancement application 128 to the preferred machine vision job/task. The user may then save the resulting imaging settings as part of a machine vision job that may be subsequently executed by the imaging device 104. The machine vision job may then instruct the imaging device 104 processors (e.g., one or more processors 118) to automatically adjust the imaging settings of the imaging device 104 in accordance with the imaging settings determined as part of the execution of the smart imaging application 116 and/or the OCR performance enhancement application 128.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 2B:
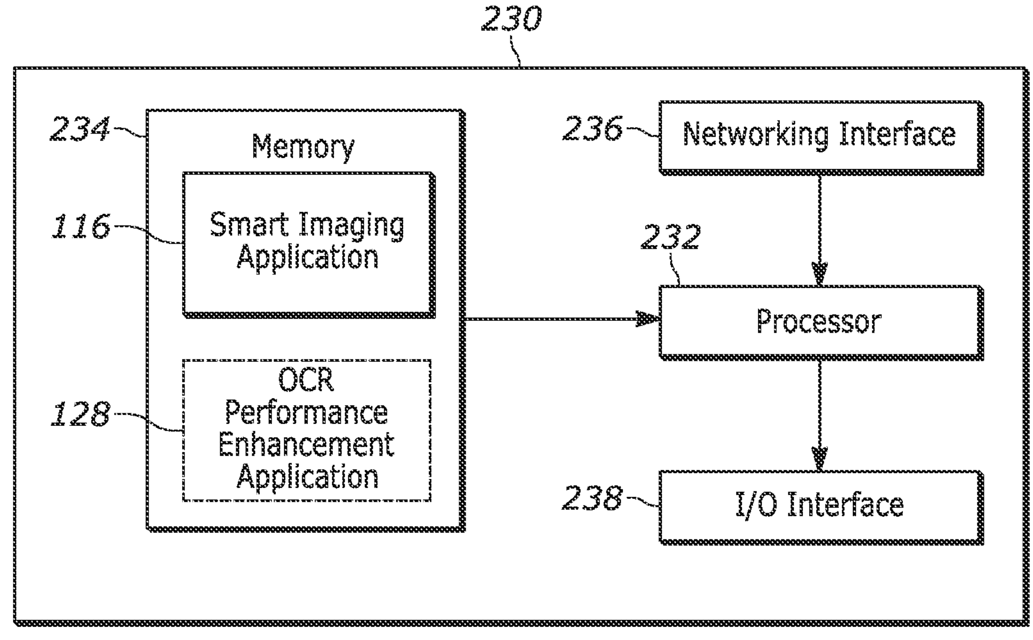
FIG. 2B is a block diagram of an example logic circuit for implementing example methods and/or operations described herein.

FIG. 2B is a block diagram representative of an example logic circuit capable of implementing, for example, one or more components of the example imaging device 104 of FIG. 2A. The example logic circuit of FIG. 2B is a processing platform 230 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 230 of FIG. 2B includes a processor 232 such as, for example, one or more microprocessors, controllers, and/or any suitable type of processor. The example processing platform 230 of FIG. 2B includes memory (e.g., volatile memory, non-volatile memory) 234 accessible by the processor 232 (e.g., via a memory controller). The example processor 232 interacts with the memory 234 to obtain, for example, machine-readable instructions stored in the memory 234 corresponding to, for example, the operations represented by the flowcharts of this disclosure. The memory 234 also includes the smart imaging application 116 and, optionally, the OCR performance enhancement application 128 that are each accessible by the example processor 232. The smart imaging application 116 and/or the OCR performance enhancement application 128 may comprise rule-based instructions, an artificial intelligence (AI) and/or machine learning-based model, and/or any other suitable algorithm architecture or combination thereof configured to, for example, enhance trainable OCR performance. To illustrate, the example processor 232 may access the memory 234 to execute the smart imaging application 116 and/or the OCR performance enhancement application 128 when the imaging device 104 (via the imaging assembly 126) captures a set of image data comprising pixel data from a plurality of pixels. Additionally, or alternatively, machine-readable instructions corresponding to the example operations described herein may be stored on one or more removable media (e.g., a compact disc, a digital versatile disc, removable flash memory, etc.) that may be coupled to the processing platform 230 to provide access to the machine-readable instructions stored thereon.

The example processing platform 230 of FIG. 2B also includes a network interface 236 to enable communication with other machines via, for example, one or more networks. The example network interface 236 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 230 of FIG. 2B also includes input/output (I/O) interfaces 238 to enable receipt of user input and communication of output data to the user. Such user input and communication may include, for example, any number of keyboards, mice, USB drives, optical drives, screens, touchscreens, etc.

Figure 3:
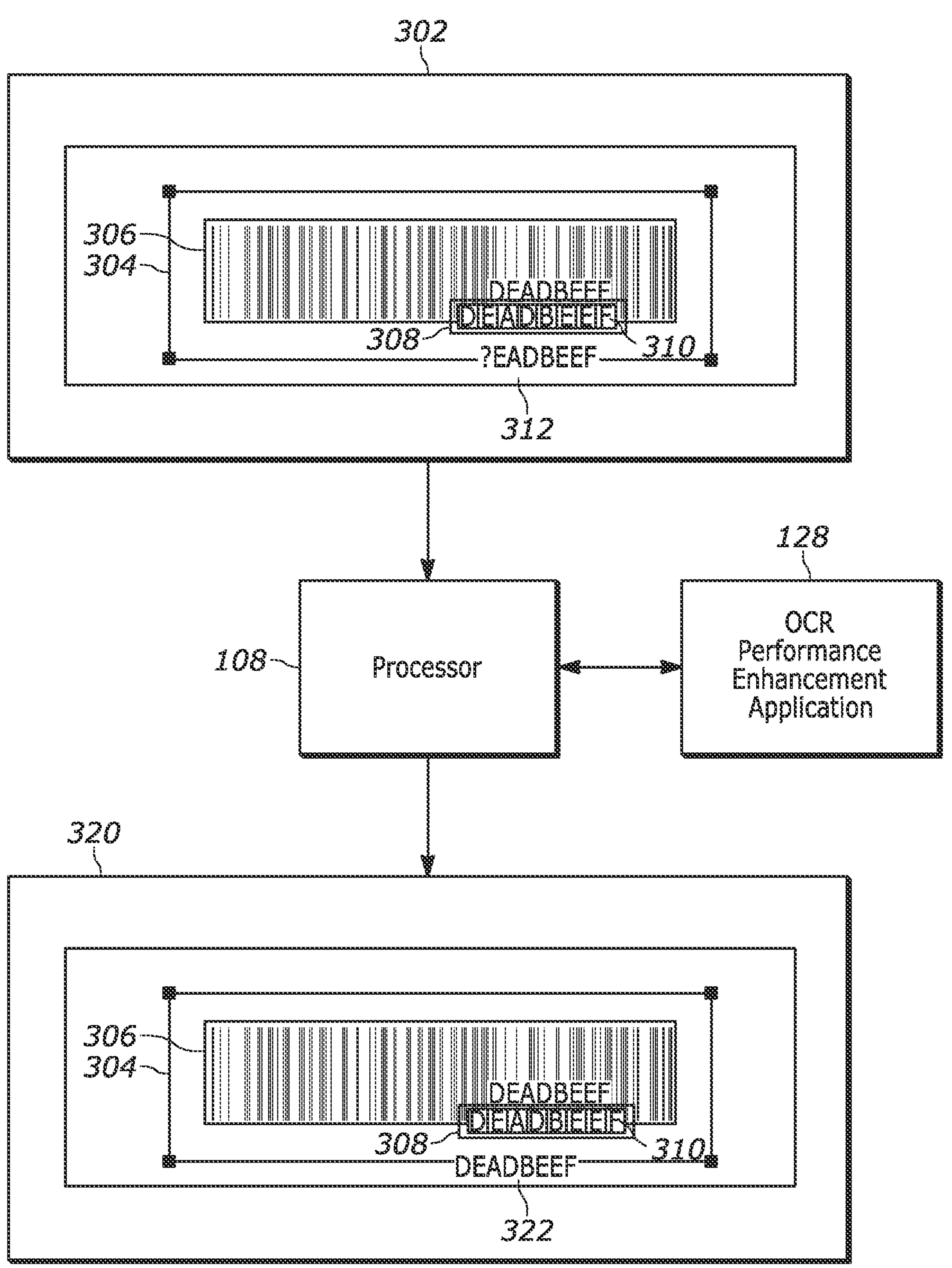
FIG. 3 is a flow diagram representing an example OCR validation performed by the OCR performance enhancement application of FIG. 1, in accordance with embodiments described herein.

FIG. 3 is a flow diagram representing an example OCR validation 300 performed by the OCR performance enhancement application 128 of FIG. 1, in accordance with embodiments described herein. The example OCR validation 300 includes a first image 302 captured by an imaging device (e.g., imaging device 104) that includes graphical overlays representative of initial machine vision processing performed by either the imaging device and/or the user computing device (e.g., user computing device 102) intended to identify/decode/interpret at least the indicia 306 and the character string 308. Of course, it should be understood that each of the first image 302, the second image 322, and/or any other suitable image and graphical overlay(s) captured and/or processed by the imaging device and/or user computing device may be rendered on a display (e.g., as part of I/O interface 114, 124) for a user to review. As a result of the initial machine vision processing, the first image 302 includes a region of interest 304, the indicia 306 (e.g., a barcode), the character string 308, a set of individual characters 310 comprising the character string 308, and an OCR result 312.

Generally, as illustrated in FIG. 3, the character string 308 may include an aberration, defect, smudge, and/or any other disturbance to the first character "D", such that the initial machine vision processing (including an OCR algorithm) performed by one or more processors (e.g., one or more processors 108, 118) may result in the one or more processors identifying and recognizing/interpreting all but the first character of the set of individual characters 310. Accordingly, the one or more processors may interpret the character string 308 in a manner similar to the OCR result 312, wherein the first character of the character string 308 is represented by a symbol or other character (here, a "?" symbol) indicating that the one or more processors are unable to recognize the first character.

As discussed herein, the one or more processors may determine that a character is unrecognizable because the characters predicted to most closely correspond to the unrecognized character output by the OCR algorithm do not have associated confidence intervals that exceed and/or otherwise satisfy a corresponding confidence threshold. In this circumstance, the OCR algorithm may be unable to recognize the character, and may not automatically update the trainable OCR library by inputting a representation of the unrecognized character as a valid representation of a known character (e.g., a character included in the trainable OCR library). However, it will be appreciated that if the OCR algorithm applied by the one or more processors 108 is able to accurately/confidently predict that a particular identified character represents a known character by virtue of the associated confidence interval exceeding and/or otherwise satisfying the corresponding confidence threshold, then the one or more processors 108 may automatically update the trainable OCR library by inputting a representation of the recognized character as a valid representation of a known character.

In any event, the one or more processors may proceed to execute the OCR performance enhancement application 128 in order to accurately identify the unrecognized first character. As part of the execution of the OCR performance enhancement application 128, the one or more processors 108 may identify and decode a payload from the indicia 306. Of course, it will be appreciated that the one or more processors 108 may independently identify and decode the payload from the indicia 306, for example, as part of the smart imaging application 106. Regardless, when the one or more processors 108 have decoded the payload from the indicia 306, the one or more processors 108, based on instructions received from the OCR performance enhancement application 128, may compare the decoded payload to the character string 308, and more particularly, each respective character of the decoded payload to a corresponding respective character in the set of individual characters 310.

The one or more processors 108 may thereby determine whether or not the character from the decoded payload corresponds closely enough to the unrecognized character to satisfy an acceptable confidence threshold. For example, the confidence threshold corresponding to an automatic recognition by the OCR algorithm may be 90%, and the acceptable confidence threshold may be 80%. In certain embodiments, the acceptable confidence threshold may be a user-defined threshold, such that a user may allow the one or more processors 108 to automatically update a trainable OCR library (e.g., as part of the OCR performance enhancement application 128) with a representation of the unrecognized character as a valid representation of a known character when the confidence interval associated with the comparison of the character from the decoded payload to the unrecognized character satisfies the acceptable confidence threshold.

Based on the determination, the one or more processors 108 may output an image similar to the second image 320 that includes the region of interest 304, the indicia 306, the character string 308, the set of individual characters 310, and a validated OCR result 322. The validated OCR result 322 may include a validated character entry for the first character of the set of individual characters 310 as a result of the comparison of the decoded payload to the character string 308. The one or more processors 108, based on instructions from the OCR performance enhancement application 128, may also update the trainable OCR library with the first character of the set of individual characters 310 as a valid representation of the known character "D".

Figure 4:
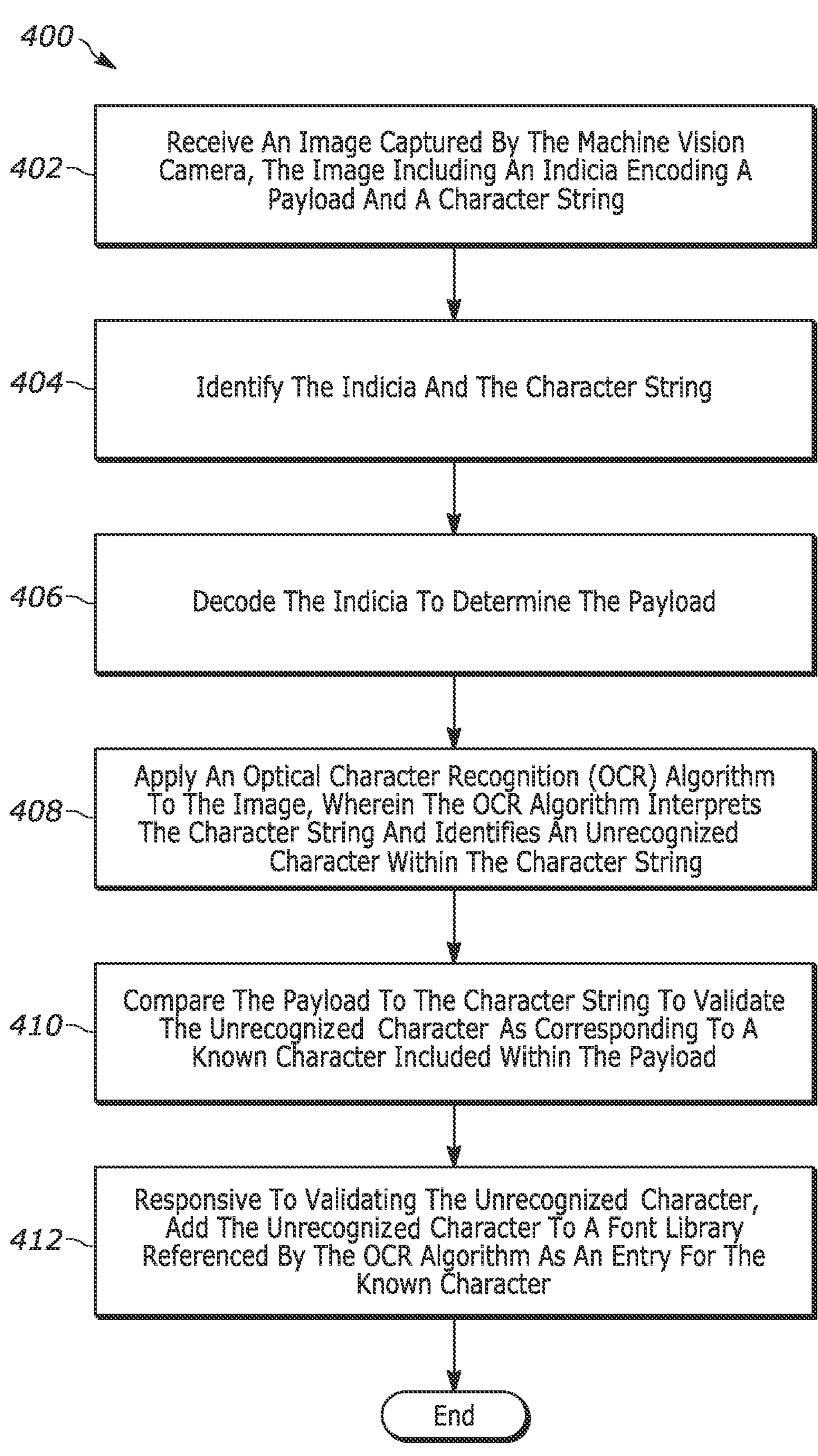
FIG. 4 is a flowchart representative of a method for enhancing trainable OCR performance, in accordance with embodiments described herein.

FIG. 4 is a flowchart representative of a method 400 for enhancing trainable OCR performance, in accordance with embodiments described herein. Generally, and as mentioned above, the method 400 for enhancing trainable OCR performance utilizes captured image data to identify an indicia and a corresponding character string, and thereafter to determine whether or not an unrecognized character included as part of the character string should be added to a trainable OCR library. More specifically, the method 400 enables the imaging device (e.g., imaging device 104) and/or another suitable device (e.g., user computing device 102) to enhance the performance of the OCR algorithm based on both a predetermined confidence threshold of the OCR algorithm and a user-defined, acceptable confidence threshold. It is to be understood that any of the steps of the method 400 may be performed by, for example, the imaging device 104, the user computing device 102, the smart imaging application 116, the OCR performance enhancement application 128, the one or more processors 108, 118, and/or any other suitable components or combinations thereof discussed herein.

At block 402, the method 400 includes receiving an image captured by a machine vision camera (e.g., imaging device 104). The image may include an indicia encoding a payload, and the image may include a character string. Further, the image may be received at an application (e.g., smart imaging application 116, OCR performance enhancement application 128) executing on a user computing device (e.g., user computing device 102) that is communicatively coupled to the machine vision camera. Once the image is received, the processors executing the application may identify the indicia and character string in the image (block 404). For example, the processors may utilize an OCR algorithm (e.g., as part of the OCR performance enhancement application 128) to identify both the indicia and the character string. The processors may then proceed to decode the indicia to determine the payload of the indicia (block 406).

The method 400 may also include applying an OCR algorithm to the image, wherein the OCR algorithm interprets the character string and identifies an unrecognized character within the character string (block 408). For example, in certain embodiments, the OCR algorithm may determine that the unrecognized character corresponds to each respective known character from the font library at respective confidence levels that do not satisfy an automatic recognition threshold, as previously mentioned.

Further, the method 400 may include comparing the payload to the character string to validate the unrecognized character as corresponding to a known character included within the payload (block 410). In certain embodiments, the one or more processors (e.g., one or more processors 108, 118) may determine, by executing the instructions comprising the OCR algorithm, whether or not the unrecognized character satisfies an acceptable confidence threshold when compared to the known character included within the payload. In these embodiments, and responsive to determining that the unrecognized character satisfies the acceptable confidence threshold, the one or more processors may validate the unrecognized character as the known character included within the payload. Moreover, the acceptable confidence threshold may be defined by a user interacting with an interface of the application.

In certain embodiments, the one or more processors may determine that the unrecognized character does not satisfy the acceptable confidence threshold. In these embodiments, and responsive to determining that the unrecognized character does not satisfy the acceptable confidence threshold, the one or more processors may compare, according to the instructions comprising the OCR algorithm, each entry of the font library corresponding to the known character to the unrecognized character. The one or more processors may further determine whether or not the unrecognized character satisfies a font library entry threshold, wherein the font library entry threshold is based on a composite similarity score between the unrecognized character and each entry of the font library corresponding to the known character. In the event that the one or more processors determine that the unrecognized character satisfies the font library entry threshold, then the one or more processors may validate the unrecognized character as the known character included within the payload.

In some embodiments, the one or more processors may determine, based on the instructions comprising the OCR algorithm, whether or not the unrecognized character satisfies an acceptable confidence threshold when compared to the known character included within the payload. However, responsive to determining that the unrecognized character does not satisfy the acceptable confidence threshold, the one or more processors may compare each entry in the font library to the unrecognized character. The one or more processors may also determine whether or not the unrecognized character satisfies a respective font library entry threshold, wherein the respective font library entry threshold is based on a respective composite similarity score between the unrecognized character and each entry of the font library corresponding to the respective known character. Responsive to determining that the unrecognized character satisfies a first respective font library entry threshold, the one or more processors may validate the unrecognized character as the first respective known character included within the payload.

As an example of the prior embodiments, assume that an unrecognized character corresponds to (represents) the letter “A”, and that the trainable OCR library includes entries corresponding to known characters “A”, “B”, “C”, and “D”, and corresponding respective font library entry thresholds of 75, 80, 80, and 90. Further, assume that the OCR algorithm analyzes the unrecognized character and is unable to confidently (e.g., satisfying the automatic recognition threshold) associate the unrecognized character with any known character included within the trainable OCR library. The OCR performance enhancement application may instruct the one or more processors to apply the OCR algorithm to the unrecognized character and each respective entry for known characters “A”, “B”, “C”, and “D”. The one or more processors may generate a first composite similarity score between the unrecognized character and the respective entries for known character “A” of 85, a second composite similarity score between the unrecognized character and the respective entries for known character “B” of 35, a third composite similarity score between the unrecognized character and the respective entries for known character “C” of 50, and a fourth composite similarity score between the unrecognized character and the respective entries for known character “D” of 40. In this example, the one or more processors may automatically (or upon receiving input from a user) update the OCR library by inputting the unrecognized character representing the character “A” as an entry for the known character “A” in the OCR library.

Of course, it should be understood that the OCR algorithm may include and/or instruct the one or more processors to use any suitable metric or combinations thereof to determine whether or not the unrecognized character sufficiently corresponds to a known character included within the payload and/or within the font library to be included as an entry for the known character within the font library.

In certain embodiments, the one or more processors may create a relative fixture of the character string and the indicia to allow a user to rotate and/or otherwise vary image characteristics of the captured image without disassociating the character string from the indicia. For example, referencing FIG. 3, the one or more processors may fix the relative locations of the indicia 306 and the character string 308, such that if a user rotates the image for optimal viewing, the one or more processors may quickly and reliably associate the indicia 306 and the character string 308. It is to be understood that the fixture created by the one or more processors may allow the processors to accurately associate the indicia and the character string regardless of the type of adjustment made to the image, such as scaling, rotating, stretching, and/or any other image adjustment or combinations thereof.

The method 400 may also include, responsive to validating the unrecognized character, adding the unrecognized character to a font library referenced by the OCR algorithm as an entry for the known character (block 412). In some embodiments, the one or more processors may display, on an interface of the application (e.g., I/O interface 114, 124), the character string with the unrecognized character replaced by the known character.

Of course, it is to be appreciated that the actions of the method 400 may be performed any suitable number of times in order to identify any unrecognized characters. Moreover, it should be understood that once the method 400 is applied for a first unrecognized character, the OCR algorithm may thereafter recognize the first unrecognized character due to its entry into the font library as an entry for a corresponding known character. As such, a subsequent iteration of the method 400 may include a second unrecognized character that is different from the first unrecognized character.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for enhancing trainable optical character recognition (OCR) performance, the method comprising:

receiving, at an application executing on a user computing device communicatively coupled to a machine vision camera, an image captured by the machine vision camera, the image including a barcode encoding a payload and a character string;

identifying, in the image, the barcode and the character string;

decoding the barcode to determine the payload;

applying the optical character recognition (OCR) algorithm to the image, wherein the OCR algorithm interprets the character string and identifies an unrecognized character within the character string;

comparing the payload to the character string to validate the unrecognized character as corresponding to a known character included within the payload; and responsive to validating the unrecognized character, adding the unrecognized character to a font library referenced by the OCR algorithm as an entry for the known character;

wherein comparing the payload to the character string further comprises:

determining, by the OCR algorithm, whether or not the unrecognized character satisfies an acceptable confidence threshold when compared to the known character included within the payload;

responsive to determining that the unrecognized character does not satisfy the acceptable confidence threshold, comparing, by the OCR algorithm, each entry in the font library to the unrecognized character;

determining, by the OCR algorithm, whether or not the unrecognized character satisfies a respective font library entry threshold, wherein the respective font library entry threshold is based on a respective composite similarity score between the unrecognized character and each entry of the font library corresponding to the respective known character; and responsive to determining that the unrecognized character satisfies a first respective font library entry threshold, validating the unrecognized character as the first respective known character included within the payload.

2. The method of claim 1, wherein the OCR algorithm identifying the unrecognized character further comprises:

determining, by the OCR algorithm, that the unrecognized character corresponds to each respective known character from the font library at respective confidence levels that do not satisfy an automatic recognition threshold.

3. The method of claim 1, wherein comparing the payload to the character string further comprises:

determining, by the OCR algorithm, whether or not the unrecognized character satisfies an acceptable confidence threshold when compared to the known character included within the payload; and responsive to determining that the unrecognized character satisfies the acceptable confidence threshold, validating the unrecognized character as the known character included within the payload.

4. The method of claim 3, wherein the acceptable confidence threshold is defined by a user interacting with an interface of the application.

5. The method of claim 3, wherein comparing the payload to the character string further comprises:

responsive to determining that the unrecognized character does not satisfy the acceptable confidence threshold, comparing, by the OCR algorithm, each entry of the font library corresponding to the known character to the unrecognized character;

determining, by the OCR algorithm, whether or not the unrecognized character satisfies a font library entry threshold, wherein the font library entry threshold is based on a composite similarity score between the unrecognized character and each entry of the font library corresponding to the known character; and responsive to determining that the unrecognized character satisfies the font library entry threshold, validating the unrecognized character as the known character included within the payload.

6. The method of claim 1, wherein comparing the payload to the character string to validate the unrecognized character further comprises:

creating, by the application, a relative fixture of the character string and the barcode to allow a user to rotate and vary image characteristics of the image without disassociating the character string from the barcode.

7. The method of claim 1, further comprising:

displaying, on an interface of the application, the character string, wherein the unrecognized character is replaced with the known character.

8. A machine vision system for enhancing trainable optical character recognition (OCR) performance, the system comprising:

a machine vision camera configured to capture an image including a barcode encoding a payload and a character string; and a user computing device executing an application, wherein the user computing device is communicatively coupled to the machine vision camera and is configured to:

receive the image captured by the machine vision camera, identify, in the image, the barcode and the character string, decode the barcode to determine the payload, apply an optical character recognition (OCR) algorithm to the image, wherein the OCR algorithm interprets the character string and identifies an unrecognized character within the character string, compare the payload to the character string to validate the unrecognized character as corresponding to a known character included within the payload, and responsive to validating the unrecognized character, add the unrecognized character to a font library referenced by the OCR algorithm as an entry for the known character;

wherein the user computing device is further configured to:

determine, by the OCR algorithm, whether or not the unrecognized character satisfies an acceptable confidence threshold when compared to the known character included within the payload, responsive to determining that the unrecognized character does not satisfy the acceptable confidence threshold, compare, by the OCR algorithm, each entry in the font library to the unrecognized character, determine, by the OCR algorithm, whether or not the unrecognized character satisfies a respective font library entry threshold, wherein the respective font library entry threshold is based on a respective composite similarity score between the unrecognized character and each entry of the font library corresponding to the respective known character, and responsive to determining that the unrecognized character satisfies a first respective font library entry threshold, validate the unrecognized character as the first respective known character included within the payload.

9. The system of claim 8, wherein the user computing device, applying the OCR algorithm, identifies the unrecognized character by determining that the unrecognized character corresponds to each respective known character from the font library at respective confidence levels that do not satisfy an automatic recognition threshold.

10. The system of claim 8, wherein the user computing device is further configured to:

determine, by the OCR algorithm, whether or not the unrecognized character satisfies an acceptable confidence threshold when compared to the known character included within the payload, and responsive to determining that the unrecognized character satisfies the acceptable confidence threshold, validate the unrecognized character as the known character included within the payload.

11. The system of claim 10, wherein the acceptable confidence threshold is defined by a user interacting with an interface of the application.

12. The system of claim 10, wherein the user computing device is further configured to:

responsive to determining that the unrecognized character does not satisfy the acceptable confidence threshold, compare, by the OCR algorithm, each entry of the font library corresponding to the known character to the unrecognized character, determine, by the OCR algorithm, whether or not the unrecognized character satisfies a font library entry threshold, wherein the font library entry threshold is based on a composite similarity score between the unrecognized character and each entry of the font library corresponding to the known character, and responsive to determining that the unrecognized character satisfies the font library entry threshold, validate the unrecognized character as the known character included within the payload.

13. The system of claim 8, wherein the user computing device is further configured to:

create, by the application, a relative fixture of the character string and the barcode to allow a user to rotate and vary image characteristics of the image without disassociating the character string from the barcode.

14. A tangible machine-readable medium comprising instructions that, when executed, cause a machine to at least:

receive, from a machine vision camera, an image including a barcode encoding a payload and a character string;

identify, in the image, the barcode and the character string;

decode the barcode to determine the payload;

apply an optical character recognition (OCR) algorithm to the image, wherein the OCR algorithm interprets the character string and identifies an unrecognized character within the character string;

compare the payload to the character string to validate the unrecognized character as corresponding to a known character included within the payload; and responsive to validating the unrecognized character, add the unrecognized character to a font library referenced by the OCR algorithm as an entry for the known character;

wherein the instructions, when executed, further cause the machine to at least:

determine, by the OCR algorithm. whether or not the unrecognized character satisfies an acceptable confidence threshold when compared to the known character included within the payload;

responsive to determining that the unrecognized character does not satisfy the acceptable confidence threshold, compare, by the OCR algorithm, each entry in the font library to the unrecognized character;

determine, by the OCR algorithm, whether or not the unrecognized character satisfies a respective font library entry threshold, wherein the respective font library entry threshold is based on a respective composite similarity score between the unrecognized character and each entry of the font library corresponding to the respective known character; and responsive to determining that the unrecognized character satisfies a first respective font library entry threshold, validate the unrecognized character as the first respective known character included within the payload.

15. The tangible machine-readable medium of claim 14, wherein the instructions, when executed, further cause the machine to at least:

identify, by the OCR algorithm, the unrecognized character by determining that the unrecognized character corresponds to each respective known character from the font library at respective confidence levels that do not satisfy an automatic recognition threshold.

16. The tangible machine-readable medium of claim 14, wherein the instructions, when executed, further cause the machine to at least:

determine, by the OCR algorithm, whether or not the unrecognized character satisfies an acceptable confidence threshold when compared to the known character included within the payload; and responsive to determining that the unrecognized character satisfies the acceptable confidence threshold, validate the unrecognized character as the known character included within the payload.

17. The tangible machine-readable medium of claim 16, wherein the instructions, when executed, further cause the machine to at least:

responsive to determining that the unrecognized character does not satisfy the acceptable confidence threshold, compare, by the OCR algorithm, each entry of the font library corresponding to the known character to the unrecognized character;

determine, by the OCR algorithm, whether or not the unrecognized character satisfies a font library entry threshold, wherein the font library entry threshold is based on a composite similarity score between the unrecognized character and each entry of the font library corresponding to the known character; and responsive to determining that the unrecognized character satisfies the font library entry threshold, validate the unrecognized character as the known character included within the payload.

* * * * *